United States Patent [19]

Sonezaki et al.

[11] Patent Number: 4,723,151
[45] Date of Patent: Feb. 2, 1988

[54] IMAGE RECORDING AND DEVELOPING APPARATUS

[75] Inventors: Suminao Sonezaki; Hiroshi Kushima, both of Kanagawa, Japan

[73] Assignee: Fuji Photo Film Co., Ltd., Japan

[21] Appl. No.: 909,391

[22] Filed: Sep. 19, 1986

[30] Foreign Application Priority Data

| Sep. 20, 1985 | [JP] | Japan | 60-209763 |
| Oct. 1, 1985 | [JP] | Japan | 60-218950 |
| Oct. 3, 1985 | [JP] | Japan | 60-221640 |
| Oct. 17, 1985 | [JP] | Japan | 60-232474 |
| Oct. 17, 1985 | [JP] | Japan | 60-232475 |
| Oct. 17, 1985 | [JP] | Japan | 60-232476 |

[51] Int. Cl.⁴ .................... G03B 27/32; G03B 27/52
[52] U.S. Cl. .................................................. 355/27
[58] Field of Search ............... 355/27, 28; 354/90, 354/92, 211, 297, 319, 320

[56] References Cited

U.S. PATENT DOCUMENTS

| 4,192,594 | 3/1980 | Oidaira et al. | 355/28 X |
| 4,351,819 | 7/1985 | Katsuyama | 355/28 X |
| 4,561,235 | 12/1985 | Yanagisawa et al. | 355/27 X |

Primary Examiner—Richard A. Wintercorn
Attorney, Agent, or Firm—Sughrue, Mion, Zinn, Macpeak, and Seas

[57] ABSTRACT

An image recording and developing apparatus includes an image recording unit for scanning a photographic photosensitive material with a light beam modulated by image information to record an image on the photographic photosensitive material, and an automatic image developing unit coupled to the image recording unit for automatically developing the image recorded on the photographic photosensitive material which as been fed from the image recording unit. The image recording unit and the automatic image developing unit are coupled to each other as a unitary assembly.

30 Claims, 11 Drawing Figures

IMAGE RECORDING AND DEVELOPING APPARATUS

BACKGROUND OF THE INVENTION

The present invention relates to an image recording and developing apparatus, and more particularly to an image recording and developing apparatus including, as a unitary assembly, an image recording unit for applying a laser beam to a photographic photosensitive material to record an image thereon and an automatic image developing unit coupled to the image recording unit for automatically developing the image recorded on the photographic photosensitive material.

There has recently been developed and widely used especially in the medical field a radiation image recording and reproducing system for producing the radiation-transmitted image of an object using a stimulable phosphor material capable of emitting light upon exposure to stimulating rays. When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays to cause the stimulable phosphor sheet to emit light representative of the radiation image. The emitted light is then photoelectrically detected to produce an image information signal that is electrically processed for generating image information which is recorded on a recording medium such as a photosensitive material or displayed as a visible image on a CRT or the like.

For permanently recording such stored radiation image information on a recording medium such as a photographic photosensitive material, an image recording unit such as an image output laser printer for example is employed in the art. More specifically, the image recording unit has a magazine containing a stack of photographic films as recording mediums, which are taken out one by one by a sheet delivery mechanism such as a suction cup. After one film has been taken out of the magazine, a laser beam modulated by an image signal produced from a stimulable phosphor sheet is applied to the film to record the image thereon. The film on which the image has newly been recorded is fed to an automatic image developing unit.

In the automatic image developing unit, the film fed from the image recording unit is moved through a developing solution contained in a developing tank and then through a fixing solution contained in a fixing tank. Thereafter, the film is either transferred through cleaning water contained in a water tank or sprayed with cleaning water.

The film is then passed through squeeze rollers to remove cleaning water off the film, and dried in a drier at a certain temperature, preferably by applying hot air of about 55° C. to the film. The dried film is stored in a storage location, and will be used for medical diagnosis or the like.

The image recording unit, i.e., the image output laser printer, for recording an image signal from a stimulable phosphor sheet on a film, and the automatic image developing unit for developing, fixing, and washing the film are indedependent of each other. From the standpoint of effectively utilizing a limited space in a facility such as a hospital or the like, it is preferable that the image output laser printer and the automatic image developing unit be positioned as closely to each other as possible. With the image output laser printer and the automatic image developing unit being closely positioned, it is necessary to employ a mechanism for automatically loading the film from the image output laser printer into the automatic image developing unit.

Where such an automatic loading mechanism is used, the image output laser printer and the automatic image developing unit are required to be connected by a transfer system such as a conveyor which takes up a certain installation space. Therefore, the overall system still occupies a relatively large space in the facility, preventing effective utilization of the limited available space therein. Since the film transferred between the image output laser printer and the automatic developing unit is not yet developed, it must be kept in a dark environment. Consequently, the transfer system such as a conveyor interconnecting the image output laser printer and the automatic developing unit requires a light shielding means and is relatively complex in structure.

In the event that the image output laser printer and the automatic image developing unit are completely separated and are to be independently operated, the conveyor and the light shielding means are not necessary. In this layout, however, the film from the image output laser printer must be handcarried by an operator to the automatic image developing unit. This is disadvantageous in that the expenditure of labor and cost is increased and the operation efficiency is low.

One solution would be to combine the image recording unit and the automatic image developing unit as a unitary assembly. If the image recording unit and the automatic image developing unit were simply joined to each other, however, an inlet for loading films would have to be defined in the front panel of the image recording unit and an outlet for unloading films would have to be defined in the rear panel of the automatic image developing unit. Therefore, the operator would be required to load a film into the recording and developing assembly through the front inlet, and to remove the film from the recording and developing assembly through the rear outlet. Consequently, the process for loading and removing films is tedious and time-consuming. If the recording and developing assembly were incorporated in a radiation image recording and reproducing apparatus, a space for taking out films from the recording and developing assembly would have to be provided in the radiation image recording and reproducing apparatus. Accordingly, it would be difficult to reduce the size of the radiation image recording and reproducing apparatus and also to reduce the floor space taken up by the apparatus.

SUMMARY OF THE INVENTION

In view of the shortcomings of the conventional arrangements, it is an object of the present invention to provide an image recording and developing apparatus comprising an image recording unit and an automatic image developing unit which are coupled to each other to allow the image recording and developing apparatus to be placed in as small a space as possible for effective utilization of a remaining space, and having a shorter transfer path for photographic photosensitive materials to be transferred therealong from an image recording section to an image developing section, the automatic image developing unit being arranged to simplify replacement of a developing solution and other solutions and cleaning of the unit, and being of a simple mechanism.

To achieve the above object, an image recording and developing apparatus comprises an image recording unit for recording an image on a photographic photosensitive material by scanning the photographic photosensitive material with a light beam modulated by image information, and an automatic image developing unit coupled to the image recording unit for automatically developing the image recorded on the photographic photosensitive material.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
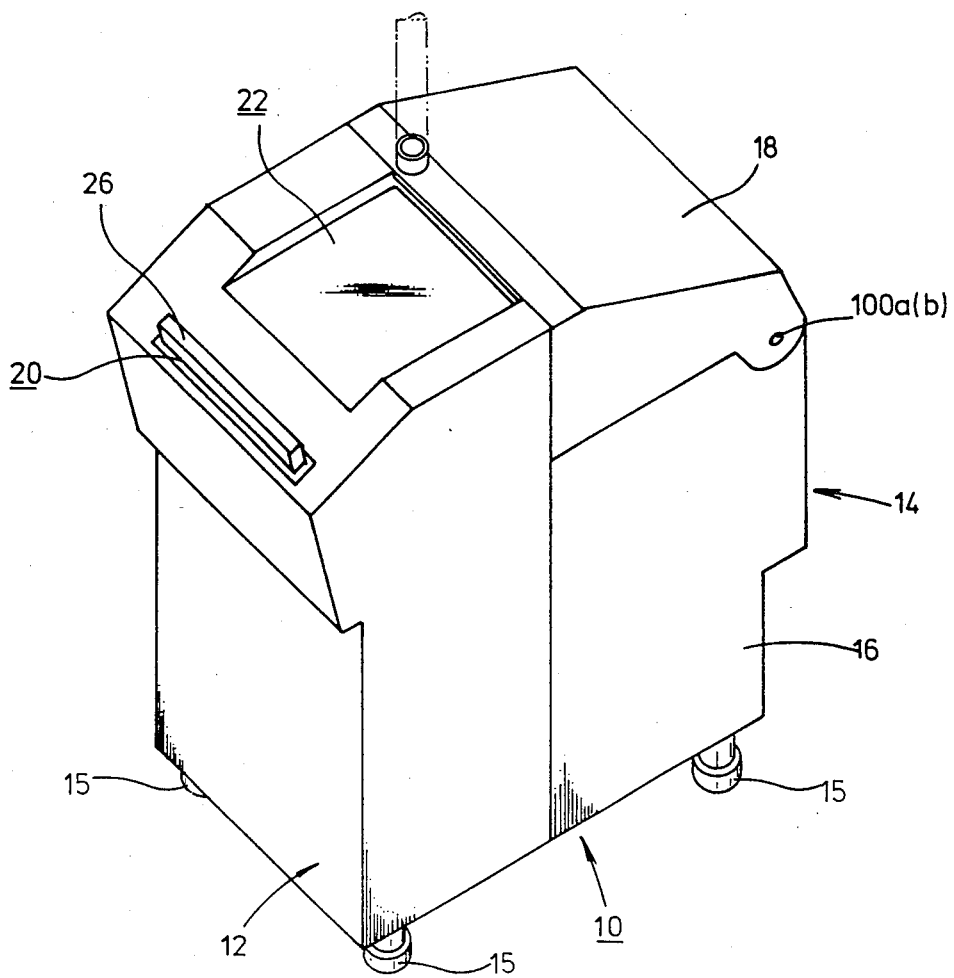
FIG. 1 is a perspective view of an image recording and developing apparatus according to an embodiment of the present invention.
Figure 2:
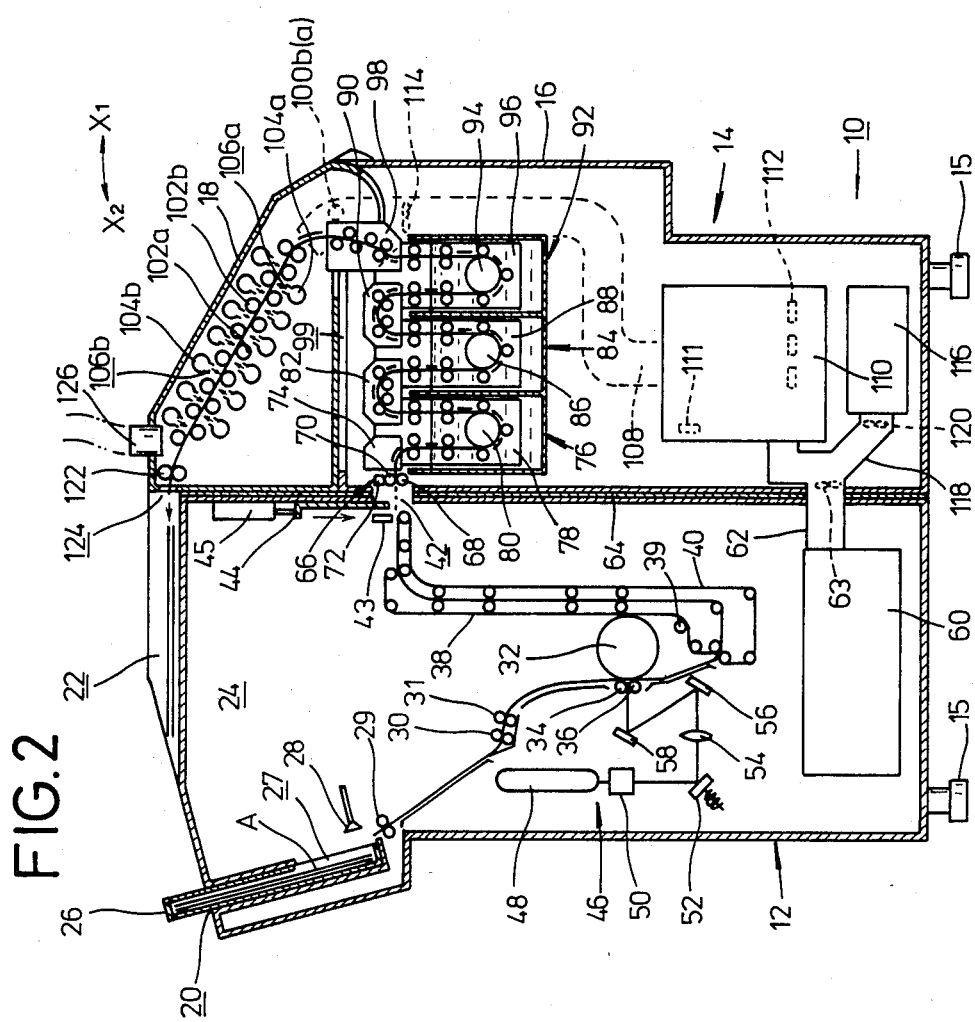
FIG. 2 is a vertical cross-sectional view of the image recording and developing apparatus shown in FIG. 1.
Figure 3:
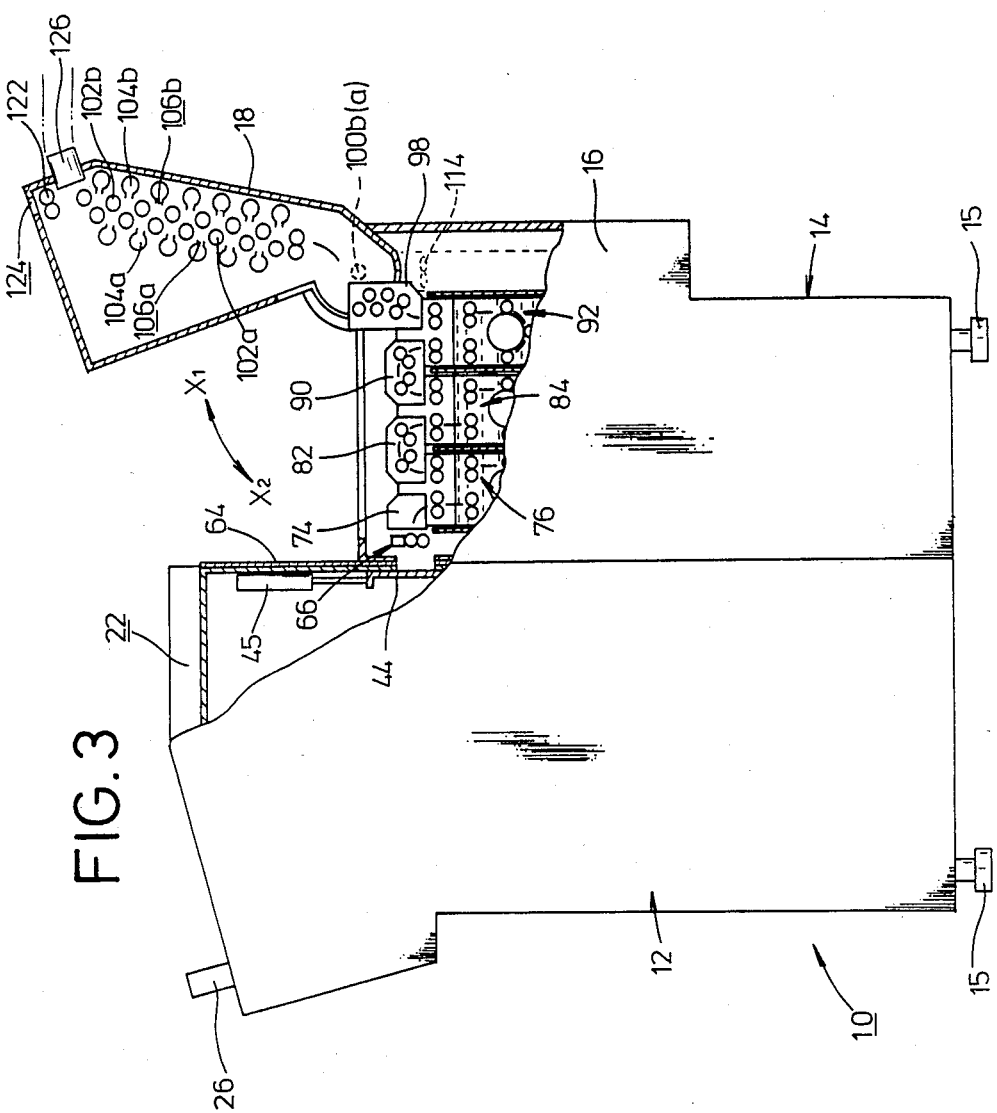
FIG. 3 is a side elevational view, partly in cross section, of the image recording and developing apparatus of FIG. 1, showing a drier in an opened position.

As shown in FIGS. 1 through 3, an image recording and developing apparatus, generally denoted at 10, includes an image recording unit 12 and an automatic image developing unit 14. The automatic image developing unit 14 comprises a film processor 16 and a film drier 18.

The image recording unit 12 and the automatic image developing unit 14 are coupled to each other as a unitary assembly which is placed on a floor by means of a pluraltiy of legs 15 having vibroisolating means such as elastic members of synthetic rubber for example. As illustrated in FIGS. 1 and 2, a film inlet slot 20 is defined in an upper front panel of the image recording unit 12, which includes a film stack tray 22 on its upper end portion. The image recording unit 12 also includes a chamber 24 defined therein and communicating with the exterior through the film inlet slot 20. A film magazine 26 is detachably inserted through the film inlet slot 20 into the image recording unit 12.

The film magazine 26 contains a stack of films A such as photographic films and has a film access opening 27 opening into the chamber 24. A film delivery mechanism including a suction cup 28 positioned in front of the film access opening 27 is disposed in the chamber 24. A pair of rollers 29 is disposed beneath the suction cup 28, and two pairs of rollers 30, 31 for transferring the films A are positioned below the rollers 29. A drum 32 is positioned downwardly of the roller pair 31, and a pair of parallel, vertically arranged rollers 34, 36 is positioned in confronting relation to the drum 32. An endless conveyor belt 38 extends vertically upwardly from a position below the drum 32.

The conveyor belt 38 has upper and lower end portions bent and extending horizontally in opposite directions. A roller 39 is rotatably held against the lower bent portion of the conveyor belt 38. Another endless conveyor belt 40 is held in operative contact with the endless conveyor belt 38 and has an upper end portion bent and extending horizontally to a position near a film outlet port 42 defined in vertical panels of the units 12, 14 and communicating with the adjacent automatic image developing unit 14. A film sensor 43 is disposed at the film outlet port 42 for detecting whether there is a film A or not in the film outlet port 42. An outlet slot closing means 44 comprising a shutter is mounted on the vertical panel of the image recording unit 12. The shutter 44 is operated by an electromagnetic actuator 45 for selectively opening and closing the film outlet port 42. Guide plates are preferably disposed between the roller pairs 29, 30 and between the roller pair 31 and the drum 32 for smoothly delivering the film A.

A laser device 46 is disposed in the image recording unit 12 for applying a laser beam to the film A transferred to the drum 32 through the space between the rollers 34, 36. The laser device 46 essentially comprises a laser generator 48, a light modulator 50, a light deflector 52, a scanning lens 54, and reflecting mirrors 56, 58.

The image recording unit 12 also includes a control box 60 having a control mechanism for controlling the operation of the image recording unit 12 and the automatic image developing unit 14.

More specifically, the control box 60 contains a circuit board supporting a memory for recording an image on the film A based on an electric signal produced from a stimulable phosphor sheet (not shown), a power source for energizing the laser device 46, and an electric circuit for controlling the operation of the conveyor system composed of the conveyor belts. To the control box 60, there is fixed one end of a duct 62 communicating with the interior of the control box 60 and housing a fan 63 therein. The duct 62 extends into the film processor 16 of the automatic image developing unit 14.

An elastic gasket member 64 is interposed between the image recording unit 12 and the automatic image developing unit 1, namely, between their vertical panels, for preventing vibration generated by the automatic image developing unit 14 from being transmitted to the image recording unit 12 in which images are required to be recorded on films with high accuracy.

The automatic image developing unit 14 will be described in detail below.

The automatic image developing unit 14 includes a film detector 66 disposed in the vicinity of the upper end of the conveyor belt 40 and facing the same through the film outlet port 42. The film detector 66 includes an insertion roller 68, a detector roller 70, and a microswitch 72. When one conveyed film A is inserted between the detector roller 70 and the insertion roller 68, the detector roller 70 is displaced upwardly to actuate the microswitch 72 which detects that the film A is inserted between the detector roller 70 and the insertion roller 68.

A first rack 74 is disposed near the film detector 66. The first rack 74 includes a curved guide for delivering the film A from the film detector 66 downwardly into an image developing device 76 through a 90°-curved path.

The image developing device 76 comprises a tank 78 containing a developing solution and housing an image developing rack 80 composed of plural rollers and guide plates. A second rack 82 composed of rollers and guide plates is disposed at a terminal end of the developing rack 80. An image fixing device 84 is positioned at an outlet of the second rack 82 and comprises an image fixing rack 86 composed of plural rollers and guide plates. The image fixing rack 86 is disposed within a fixing solution contained in a tank 88. A third rack 90 composed of rollers and guide plates is disposed at a terminal end of the image fixing rack 86 and has an outlet positioned near a washing device 92 comprising a washing rack 94, which is immersed in cleaning water contained in a tank 96. The washing rack 94 has an outlet positioned near a squeezing device 98. The squeezing device 98 comprises rollers and guide plates for delivering the film A from the water cleaning device 92 substantially upwardly into the film drier 18.

As shown in FIG. 2, the film drier 18 is positioned above the film processor 16 and closes an upper opening 99 of the film processor 16. The film drier 18 has an upper panel slanted downwardly in the rearward direction and support pins 100a, 100b disposed on opposite rear sides and engaging the film processor 16 for pivotal movement of the film drier 18 with respect to the film processor 16. The film drier 18 is shown as being inclined upwardly with respect to the image recording unit 12. However, it would be possible to keep the film drier 18 horizontally in continuously aligned relation to the film stack tray 22 by positioning the support pins 100a, 100b a certain distance upwardly of the illustrated position.

Figure 4:
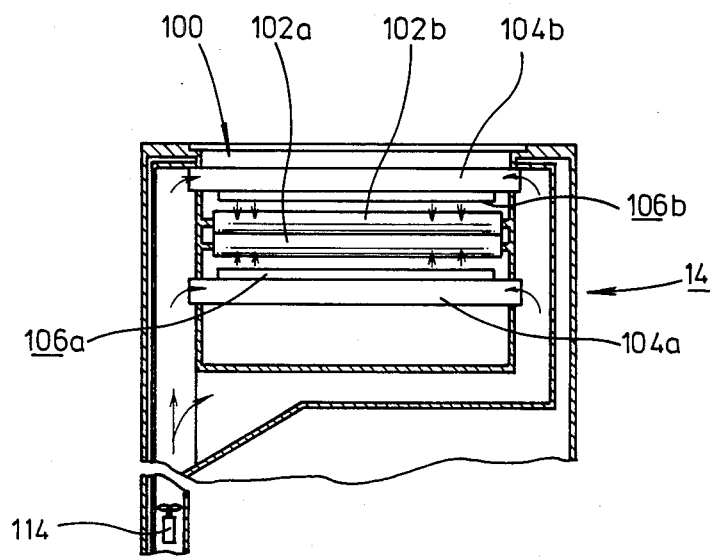
FIG. 4 is a fragmentary vertical cross-sectional view of the drier shown in FIG. 3.

The film drier 18 includes a group of rollers 102a disposed for contact with one surface of the film A, and another group of rollers 102b disposed for contact with the opposite surface of the film A, the rollers 102b alternating with the rollers 102a. These groups of rollers 102a, 102b are arrayed obliquely upwardly toward the image recording unit 12. A plurality of air jet pipes 104a are disposed along the array of rollers 102a in confronting relation to the rollers 102b, respectively, and similarly a plurality of air jet pipes 104b are disposed along the array of rollers 102b in confronting relation to the rollers 102a, respectively. The air jet pipes 104a, 104b have air jet slits 106a, 106b for ejecting hot air toward the film A as it is conveyed between the rollers 102a, 102b. As shown in FIG. 4, the air jet pipes 104a, 104b are longer than the rollers 102a, 102b in their axial direction.

To the film drier 18, there is connected an air temperature control mechanism 110 through a duct 108, the air temperature control mechanism 110 having a heater 112 and a temperature sensor 111 comprising a thermostat. The duct 108 houses a fan 114 for supplying air heated by the heater 112 into the film drier 18. The duct 62 extending from the control box 60 has one end connected to the air temperature control mechanism 110 and is branched to a duct 118 extending from an image development control box 116. The control box 116 serves to control the operation of the automatic image developing unit 14 and contains a circuit board for controlling the heating operation of the heater 112, a circuit board for controlling the temperatures of the developing solution of the image developing device 76 and the fixing solution of the image fixing device 84, a control circuit board for delivering the film A from the image recording unit 12 to the image developing unit 14, and a power source. The duct 118 connected to the image development control box 116 houses a fan 120. Since the film drier 18 is swingable with respect to the film processor 16, the duct 108 has a bellows of heat-resistant synthetic resin at its end extending into the film drier 18, or is connected to the film drier 18 through a rotary joint or the like which is located at the center of swinging movement of the film drier 18.

A pair of rollers 122 is disposed in the film drier 18 at an outlet thereof which has a film outlet slot 124 near the rollers 122. The film outlet slot 124 opens into the film stack tray 22. The film drier 18 also includes an air vent 126 near the roller pair 122 for discharging drying air through a flexible tube (not shown).

It is preferable to provide a light shielding member between the film processor 16 and the film drier 18 for preventing extraneous light from entering from the film drier 18 into the film processor 16.

Operation of the image recording and developing apparatus thus constructed is as follows:

When the film magazine 26 is loaded through the film inlet slot 20 into the image recording unit 12, the opening 27 of the film magazine 26 opens into the chamber 24. Then, the film delivery mechanism including the suction cup 28 is driven by the control mechanism in the control box 60 for taking out the films A one by one with the suction cup 28. The film A taken out of the film magazine 26 is conveyed by the roller pairs 29, 30, 31 until the film A is sandwiched between the drum 32 and the rollers 34, 36.

The control mechanism in the control box 60 is supplied with an image signal produced from a stimulable phosphor sheet by an image readout device (not shown). The laser device 46 is driven by the control mechanism based on the image signal supplied thereto. More specifically, a laser beam emitted from the laser generator 48 is modulated by the light modulator 50 with the image information represented by the image signal. The modulated light beam is deflected by the light deflector 52 and converged by the scanning lens 54. Then, the light beam is reflected by the mirrors 56, 58 and applied to the film A through the space between the rollers 34, 36. At this time, the light deflector 52, scanning lens 54, and the reflecting mirrors 56, 58 are angularly displaced to record a desired image on the film A. The laser generator 48, the light modulator 50, the light deflector 52, and the film delivery mechanism are driven by the control mechanism in the control box 60.

After the image has been recorded on the film A, the film A is gripped between the conveyor belts 38, 40 and conveyed upwardly from a lower portion of the image recording unit 12. The film A is then moved through the film outlet port 42 between the image recording unit 12 and the automatic film developing unit 14 toward the film detector 66.

At this time, the film sensor 43 detects the arrival of the film A and issues a signal to energize the electromagnetic actuator 45 for displacing the shutter 44 to open the film outlet port 42. When the film sensor 43 detects the completion of passage of the film A, i.e., when the film A is completely delivered into the automatic image developing unit 14, the film sensor 43 issues a signal to energize the electromagnetic actuator 45 again to move the shutter 44 to close the film outlet port 42. In this manner, the image recording unit 12 and the automatic image developing unit 14 are isolated from each other unless the film outlet port 42 is to be opened for delivery of the film A from the image recording unit 12 into the automatic image developing unit 14.

As the film A passes through the film detector 66, the microswitch 72 is turned on to indicate that the film A has been transferred into the automatic film developing unit 14. The film A that has passed through the film detector 66 is delivered downwardly through the first rack 74 serving as a film feeder under the control of the circuit in the control box 116, and then gripped by the image developing rack 80 so as to be immersed in the developing solution in the tank 78 of the image developing device 76. Then, the film A is fed in the tank 78 through a 180°-curved path therein and transferred to the second rack 82 serving as a film feeder. The film A having reached the second rack 82 is fed by the guide plates and rollers thereof to travel through a 180°-curved path into the image fixing rack 86 where the film A is immersed in the fixing solution in the tank 88 of the image fixing device 84. Thereafter, the film A is conveyed upwardly to the third rack 90 serving as a film feeder, by which the film A is fed downwardly into the washing rack 94 where the film A is washed in the tank 96 of the washing device 92. After the film A has been washed, the film A is delivered into the squeezing device 98 in which water is squeezed off the film A, which is then introduced into the film drier 18.

In the film drier 18, the film A is fed along with the opposite surfaces thereof being contacted by the rollers 102a, 102b. During travel of the film A on the rollers 102a, 102b, hot air having a temperature of about 55° C. supplied from the duct 108 is ejected from the air jet pipes 104a, 104b through the air jet slits 106a, 106b against the film A to vaporize any remaining water on the opposite surfaces of the film A. Therefore, when the film A is finally led out of the film outlet slot 124 through the roller pair 122, the image developing process has been completely finished, and the film A is dried. More specifically, hot air at about 55° C. is forced by the fan 114 from the duct 108 out of the air jet pipes 104a, 104b. The temperature of the ejected hot air must be adjusted at all times by the air temperature control mechanism 110. The thermostat 111 in the air temperature control mechanism 110 detects the temperature of the drying hot air supplied to the film drier 18. When the detected temperature is lower than a prescribed temperature level, the air temperature control mechanism 110 energizes the heater 112 to increase the temperature of the drying hot air supplied to the film drier 18. The hot air thus adjusted in temperature is introduced by the fan 114 from the duct 108 into the air jet pipes 104a, 104b and ejected through the air jet slits 106a, 106b against the opposite surfaces of the film A. The hot air ejected against the film A is discharged through the air vent 126 out of the film drier 18.

The interior of the air temperature control mechanism 110 is supplied with hot air from the control box 60 through the duct 62 and with hot air from the control box 116 through the duct 118. More specifically, the control box 60 houses the control mechanism for controlling the operation of the image recording unit 12 and particularly the memory for driving the laser device 46 based on the electric signal produced from the stimulable phosphor sheet. Therefore, the control box 60 consumes a considerable amount of electric power normally ranging from 300 W to 400 W. Consequently, heat is generated in the control box 60 and air therein is heated to a substantial temperature.

Air in the control box 116 is also heated by the power source and the circuit boards housed therein. The heated air in the control boxes 60, 116 is supplied through the ducts 62, 118 into the air temperature control mechanism 110 in which the air temperature is made considerably high. Since the high air temperature in the air temperature control mechanism 110 is detected by the thermostat 111, the air in the air temperature control mechanism 110 can quickly be heated to the desired temperature level when the heater 112 is heated. If the air from the control boxes 60, 116 is hot enough, the air temperature in the air temperature control mechanism 110 does not need to be heated by the heater 112. Therefore, the power requirement for the heater 112 is lower than would be if fresh air were introduced into the air temperature control mechanism 110. Furthermore, inasmuch as the heated air in the control boxes 60, 116 is not directly discharged out of the apparatus 10, the air-conditioning in the room in a hospital or the like in which the apparatus is installed is not greatly disturbed. Where the air vent 126 is extended out of the room, the heat generated by the apparatus 10 is directly discharged out of the room without any substantial effect on the air conditioning of the room.

After the image recording and developing apparatus 10 has been operated for a desired period of time, the apparatus 10 is shut off and the racks 82, 90 and the squeezing device 98 of the automatic image developing unit 14 are serviced. Such servicing can easily be carried out for the following reasons:

As described above, the film drier 18 is swingable with respect to the film processor 16. By lifting the film drier 18 in the direction of the arrow X1, the opening 99 of the film processor 16 is opened to external view as shown in FIG. 3. Therefore, any developing solution, fixing solution, and other dirt or deposits can easily be removed from the racks 82, 90, the squeezing device 98, and other components. At this time, the developing, fixing, and washing solutions can be supplied or replaced.

After the servicing procedure has been finished, the film drier 18 is swung in the direction of the arrow X2 onto the film processor 16 to close the opening 99 in readiness for a next cycle of automatic image development.

While the film A is being processed in the automatic image developing unit 14, the racks and the air fans 63, 114, 120 for supplying hot air to the air jet pipes 104a, 104b are driven by the control boxes 60, 116, and small vibration is generated in the automatic image developing unit 14. Such small vibration would tend to be transmitted from the automatic image developing unit 14 to the image recording unit 12 coupled thereto. Since, however, the elastic gasket member 64 is interposed between the image recording unit 12 and the automatic image developing unit 14, the image recording unit 12 is prevented from vibrating due to the operation of the automatic image developing unit 14. In addition, inasmuch as the image recording unit 12 and the automatic image developing unit 14 are installed on the floor by the legs 15 having elastic members, no vibration is transmitted from the automatic image developing unit 14 via the floor to the image recording unit 12. As a result, when an image is recorded on a film A by the laser device 46 in the image recording unit 12 while another film A is being developed in the automatic image developing unit 14, the laser beam is prevented from being disturbed and hence the image is prevented from being recorded inaccurately. Such a vibro-isolating arrangement allows the image recording process and the image developing process to be effected concurrently, with the consequence that a great number of images can be recorded and developed in a short period of time.

While the image on the film A is being developed in the automatic image developing unit 14, a gas is produced from the image developing device 76 and the image fixing device 84 and would be apt to enter the chamber 24 of the image recording unit 12 through the film outlet port 42, causing damage to the mirrors 56, 58 of the laser device 46 thereby to prevent an image from being accurately recorded on a film A in the image recording unit 12. However, the entry of such a gas into the chamber 24 through the film outlet port 42 is highly limited since the film outlet port 42 is normally closed by the shutter 44 and opened only when the film A is fed through the film outlet port 42. Accordingly, the laser device 46 can be operated highly accurately for a long period of time without being damaged by a gas generated in the automatic image developing unit 14.

The film inlet slot 20 and the film stack tray 22 are disposed on the image recording unit 12 closely thereto to allow films A to be loaded and unloaded with ease. This layout permits the image recording and developing apparatus 10 to be combined easily with a radiation image recording and reproducing apparatus. More specifically, the operator can load the film magazine 26 into the image recording unit 12 at its front and unload films A with images developed thereon from the film stack tray 22 also at the front of the image recording unit 12 for delivery to another location for storage or other purpose. The operator can handle the apparatus 10 easily since he or she is not required to move behind the apparatus A to take out the developed films A.

The path of travel of the films A through the apparatus 10 is short for efficient film delivery from the film inlet slot 20 to the film outlet slot 124 because the film outlet slot 124 opens into the film stack tray 22.

As described above, the air which is heated by the heat generated in the image recording and developing units 12, 14 is supplied through the ducts 62, 118 into the air temperature control mechanism 110, and may further be heated by the heater 112 for drying the films A after the images have been developed thereon. Since the air supplied to the air temperature control mechanism 110 is already considerably hot, any electric power consumption by the heater 112 for heating the air to a desired temperature is much lower than would be if fresh air supplied from outside of the apparatus 10 were heated to the desired temperature.

An image recording and developing apparatus according to another embodiment of the present invention will be described with reference to FIGS. 5 and 6. Those components shown in FIGS. 5 and 6 which are identical to those shown in FIGS. 1 through 4 are denoted by identical reference numerals, and will not be described in detail.

Figure 5:
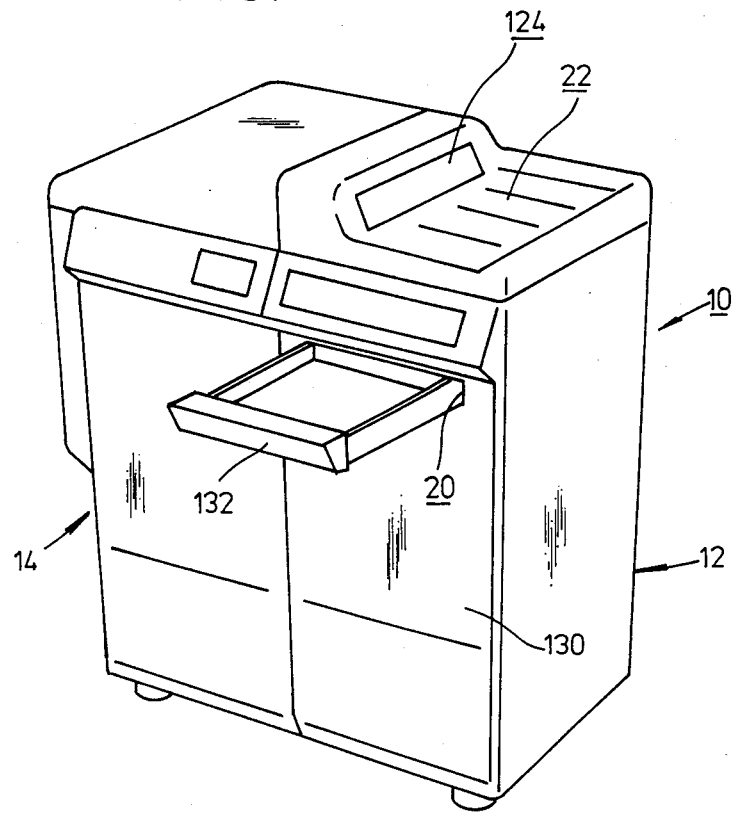
FIG. 5 is a perspective view of an image recording and developing apparatus according to another embodiment of the present invention.

As illustrated in FIG. 5, the image recording and developing apparatus 10 has its film inlet slot 20 defined in the image recording unit 12 in an upper portion of a side wall 130 thereof. A tray 132 is slidably fitted in the film inlet slot 20. Therefore, by placing the film magazine 26 in the tray 132, and pushing the tray 132 into the film inlet slot 20, films can be delivered one by one from the loaded film magazine 26 in the same manner as described with reference to the preceding embodiment.

The film stack tray 22 is defined in the top panel of the image recording unit 12. The film stack tray 22 is supplied with a film A which has been passed through the image developing process, the image fixing process, the washing process, and the drying process and which has been discharged in the direction of the arrow (FIG. 6) out of the film outlet slot 124.

With the arrangement shown in FIG. 5, therefore, the processed film A is discharged in a direction that is normal to the direction in which the film magazine 26 has been loaded into the image recording unit 12.

The internal structure of the image recording and developing apparatus of FIG. 5 will be described with reference to FIG. 6. The suction cup 28 serving as the film delivery mechanism is disposed in confronting relation to the film magazine 26 accommodated in the tray 132. The suction cup 28 picks up a film A under vacuum from the film magazine 26 and delivers the film A to a conveyor system 134 composed of roller pairs and guide plates. The conveyor system 134 extends from the suction cup 28, first downwardly, is then curved obliquely downwardly, then lies horizontally, and rises vertically upwardly toward the film outlet port 42. The horizontal portion of the conveyor system 134 includes two pairs of rollers 136, 138 which grip and feed the film A at a constant speed in an auxiliary scanning direction.

The laser device 46 is disposed below the tray 132 to emit a laser beam which is cyclically deflected in a main scanning direction between the roller pairs 136, 138 to record an image on the film A as it is fed by these roller pairs.

The film A which has been introduced from the film outlet port 42 into the automatic image developing unit 14 goes through the image developing device 76, the image fixing device 84, and the washing device 92 to the squeezing device 98. Then, water remaining on the film A on which the image has been developed is evaporated by drying air in the film drier 18. The film A is thereafter discharged from the film outlet slot 124 into the film stack tray 22. The automatic image developing unit 14 also includes a solution supply device 140 for supplying solutions respectively to the image developing device 76, the image fixing device 92, and the washing device 92.

Figure 6:
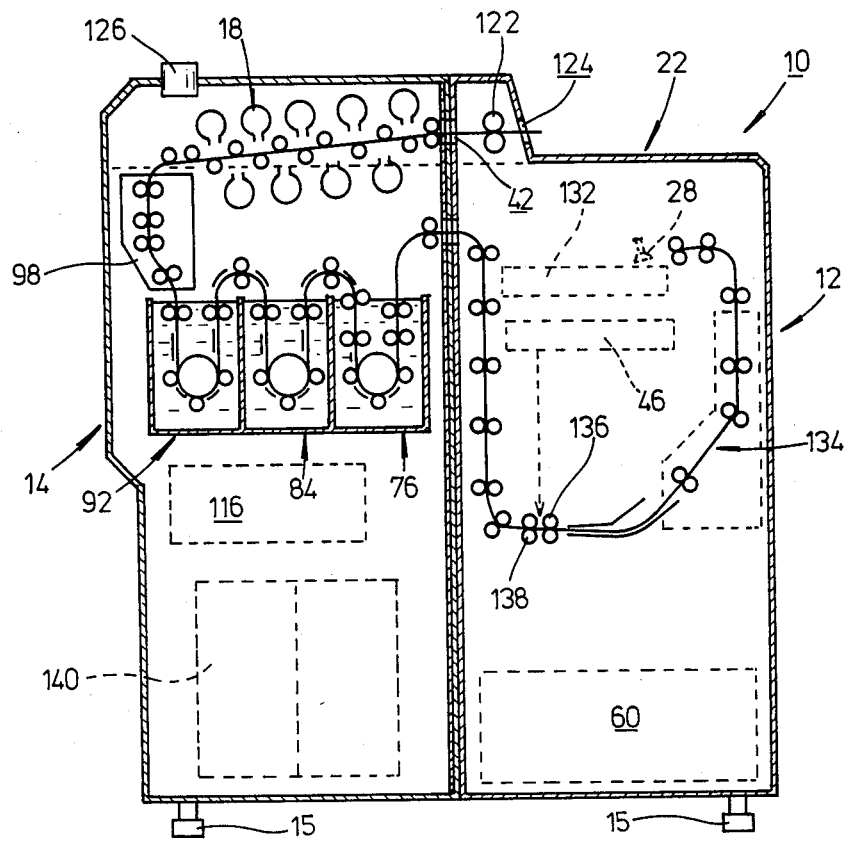
FIG. 6 is a vertical cross-sectional view of the image recording and developing apparatus shown in FIG. 5.

In the embodiment of FIGS. 5 and 6, the dried film on which the image has been developed and fixed is discharged in the direction normal to the direction in which the film has been loaded into the image recording unit. Since the film loading position and the film discharging position are close to each other, the operator can handle the films while staying in a fixed position at all times. Inasmuch a back side wall of the apparatus 10 which is opposite to the side wall 130 can be placed in intimate contact with a wall or the like, the apparatus 10 is highly effective in utilizing a limited space.

In the foregoing illustrated embodiments, the image recording unit 12 and the automatic image developing unit 14 are joined together in horizontally juxtaposed relation. However, the inventors have found that the image recording unit 12 and the automatic image developing unit 14 may not necessarily be horizontally juxtaposed, but may be positioned in vertially tandem relation. Such a modified arrangement will be described with reference to FIGS. 7 through 9 in which those components which are identical to those shown in FIGS. 1 through 4 are denoted by identical reference numerals with a suffix a.

An image recording and developing apparatus 10a generally has an image recording unit 12a and an automatic image developing unit 14a, which are vertically arranged and coupled together as a unitary assembly. The image recording unit 12a is disposed above a storage casing 150 containing the automatic image developing unit 14a, which can be pulled out to the right (FIG. 7) from the storage casing 150. A film magazine insertion tray 160 is attached to a front panel of the image recording unit 12a and has one end positioned in a film inlet slot 162. As shown in FIG. 8, a film magazine 26a can detachably loaded through the film inlet slot 162 into the image recording unit 12a. The film inlet slot 162 opens into a chamber 24a defined in the image recording unit 12a and housing a pair of slide rails 164a, 164b along which the film magazine 26a can smoothly be loaded and unloaded. Coil springs 166a, 166b are disposed adjacent to ends of the slide rails 164a, 164b for normally urging the loaded film magazine 26a in a direction to allow the film magazine 26a to be easily unloaded from the film inlet slot 162. The film magazine 26a has a shutter 168 for closing a film access opening 27a thereof. A film delivery mechanism including a suction cup 28a is disposed in the chamber 24a near the film access opening 27a of the film magazine 26a. On one side of the suction cup 28a, there are disposed plural spaced pairs of rollers 170 arrayed horizontally in a direction away from the suction cup 28a for transferring films A one by one. Guide plates 172 are disposed between respective pairs of rollers 170 for holding the films A horizontally as they are fed by the rollers 170.

Figure 8:
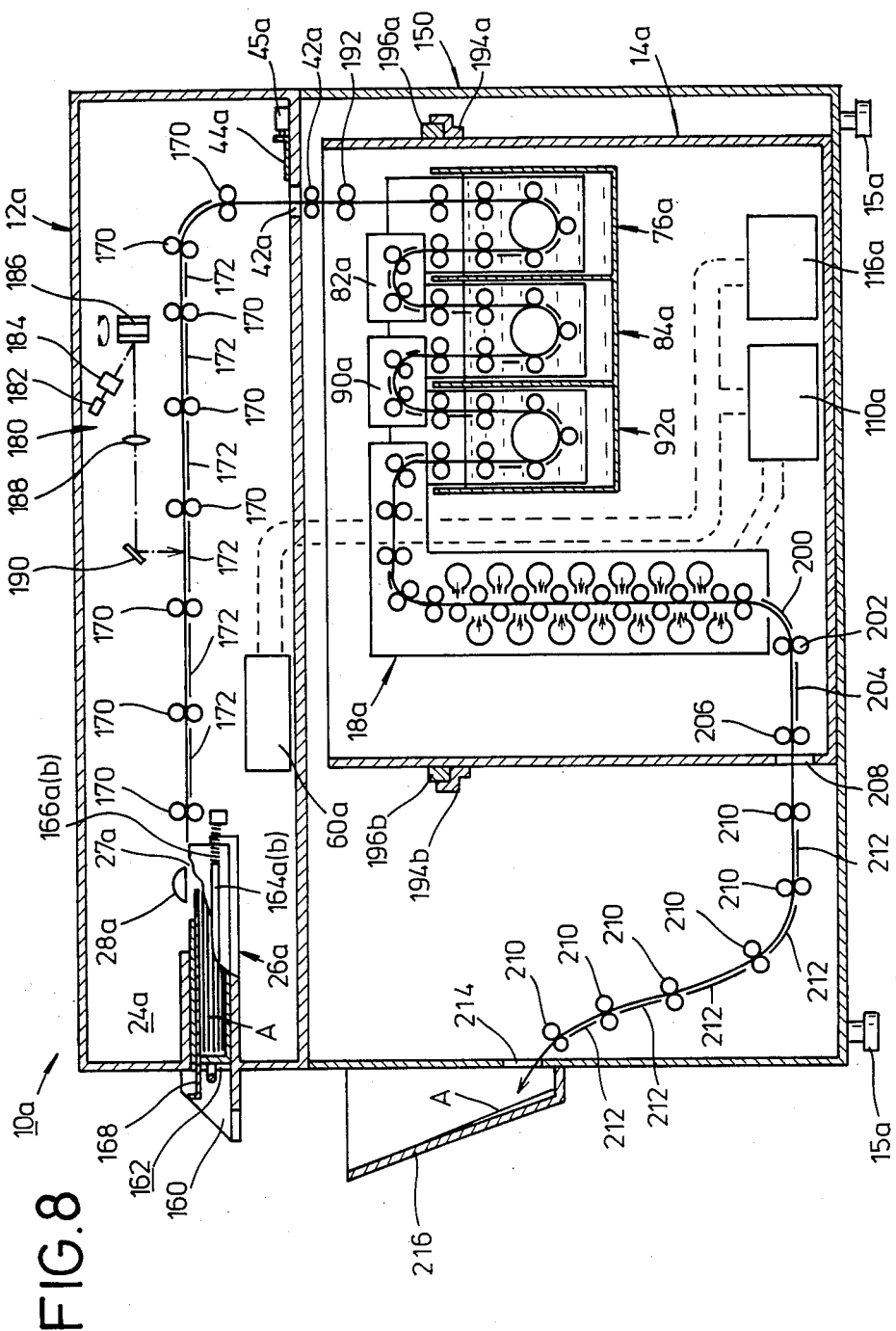
FIG. 8 is a vertical cross-sectional view of the image recording and developing apparatus shown in FIG. 7.
Figure 9:
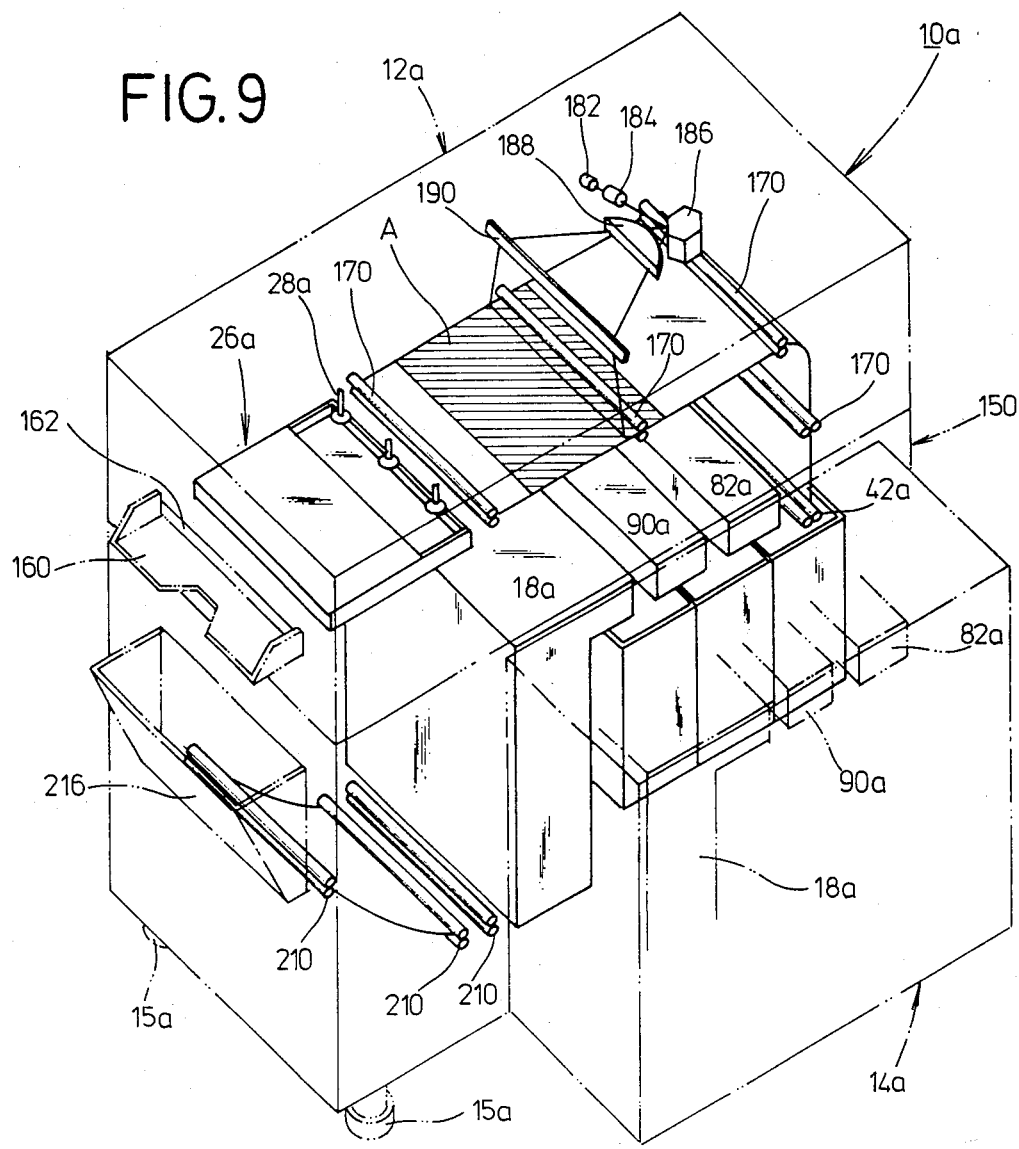
FIG. 9 is a schematic perspective view showing the internal structure of the image recording and developing apparatus shown in FIG. 7.

The image recording unit 12a has a film outlet port 42a defined in a lower panel thereof below the final pair of rollers 170, the film outlet port 42a opening into the storage casing 150. The film oulet port 42a is preferably selectively closable by a shutter 44a disposed on the lower panel of the image recording unit 12a and drivable by an electromagnetic actuator 45a. A laser device 180 is disposed in the image recording unit 12a for applying a laser beam (indiated by the dot-and-dash line in FIG. 8) to a film A which is being transferred by the rollers 170 and the guide plates 172. The laser device 180 is essentially composed of a laser generator 182, a light modulator 182, a rotating polygonal mirror 186, a condenser lens 188 in the form of an f $\theta$ lens, and a reflecting mirror 190. The rotating polygonal mirror 186 is rotatable about its own axis in the direction of the arrow by a rotational drive means (not shown). The laser beam emitted from the laser generator 182 has its optical axis shown as extending obliquely upwardly of the rotating polygonal mirror 186 for illustrative purpose. In reality, however, the optical axis of the emitted laser beam lies in a plane normal to the sheet of FIG. 8 and in which the optical axis of the beam reflected by the rotating polygonal mirror 186 lies, as shown in FIG. 9.

The automatic film developing unit 14a has a pair of rollers 192 positioned directly below the film outlet port 42a of the image recording unit 12a.

The automatic image developing unit 14a with its upper end opening toward the image recording unit 12a is housed in the storage casing 150. The automatic image developing unit 14a is laterally movable into and out of the storage casing 150 in the directions of the arrows X3, X4 in FIG. 7. The storage casing 150 has two parallel horizontal guide rails 194a, 194b with which holders 196a, 196b on the automatic image developing unit 14a slidably engage for permitting lateral sliding movement of the automatic image developing unit 14a into and out of the storage casing 150. The automatic image developing unit 14a includes an image developing device 76a, an image fixing device 84a, a washing device 92a, and a film drier 18a.

A curved guide 200 is disposed below the film drier 18a for delivering a film from the film drier 18a in a horizontal direction. The curved guide 200 is followed by a pair of rollers 202 which is disposed at one end of a guide plate 204 with its other end positioned near another pair of rollers 206. The rollers 206 are located adjacent to a film outlet port 208 defined in a side wall of the automatic film developing unit 14a. From the film outlet port 208, there are arrayed plural pairs of rollers 210 and plural guide plates 212 disposed therebetween for delivering the film A toward a film outlet slot 214 defined in a side wall of the storage casing 150. A film tray 216 is attached to the side wall of the storage casing 150 for receiving the films A discharged from the film outlet slot 214.

In operation, the film magazine 26a is loaded via the magazine insertion tray 160 and the film inlet slot 162 into the chamber 24a along the guide rails 164a, 164b. The shutter 168 is manually or automatically moved to open the film access opening 24a, through which a film A is taken out by the suction cup 28a. A desired image is then recorded on the film A by the laser device 180 while the film A is being fed along by the rollers 170 and the guide plates 172.

The film A on which the image has been recorded is then delivered through the film outlet port 42a opened by the shutter 44a and fed by the rollers 192 into the automatic image developing. The film A is then moved through the image developing device 76a, the image fixing device 84, and the washing device 92a, and is dried by the film drier 18a. Thereafter, the dried film A is delivered out of the automatic image developing unit 14a through the film outlet port 214, and guided by the rollers 210 and the guide plates 212 into the film tray 216 via the film outlet slot 214. While the film A is in the film drier 18a, the film drier 18a is supplied with hot air at about 55° C. via an air temperature control mechanism 110 from control boxes 60a, 116a which contain various circuits for controlling the operation of the image recording unit 12a and the image developing unit 14a.

Figure 7:
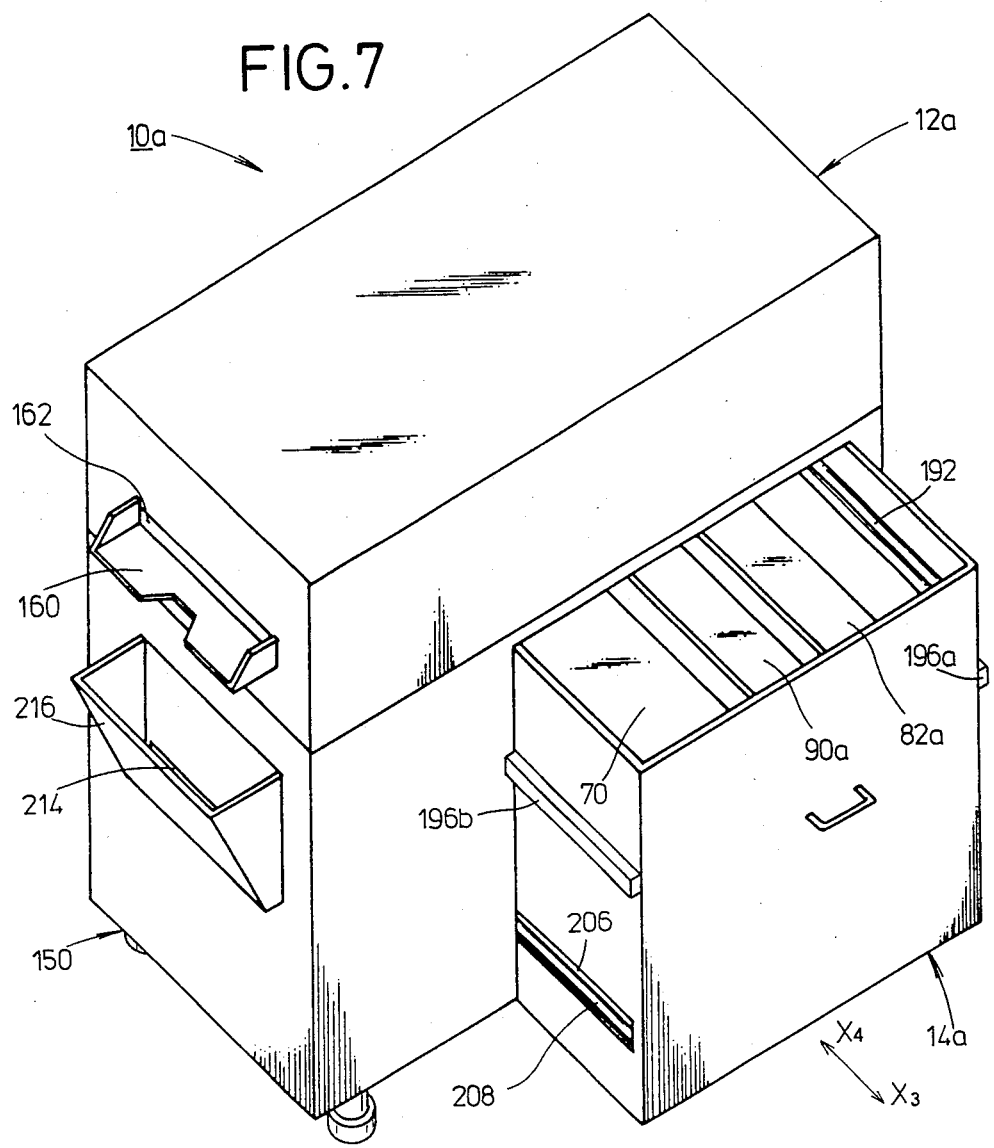
FIG. 7 is a perspective view of an image recording and developing apparatus according to still another embodiment of the present invention.

As shown in FIG. 7, the automatic image developing unit 14a can be pulled out of the storage casing 150 in the direction of the arrow X3 along the guide rails 194a, 194b held in sliding engagement with the holders 196a, 196b, respectively. With the automatic image developing unit 14a thus pulled out, the image developing device 76a, the image fixing device 84a, the washing device 92a, the film drier 18a are exposed and can easily be serviced such as by removing or replacing the developing and fixing solutions and the cleaning water. Therefore, the apparatus 10a can be serviced with ease.

After the automatic image developing unit 14a has been serviced, it can be pushed into the storage casing 150 in the direction of the arrow X4. Since only a space for accommodating the automatic image developing unit 14a is required on one side of the storage casing 150, the apparauts 10a requires a relatively small space for its installation.

Figure 10:
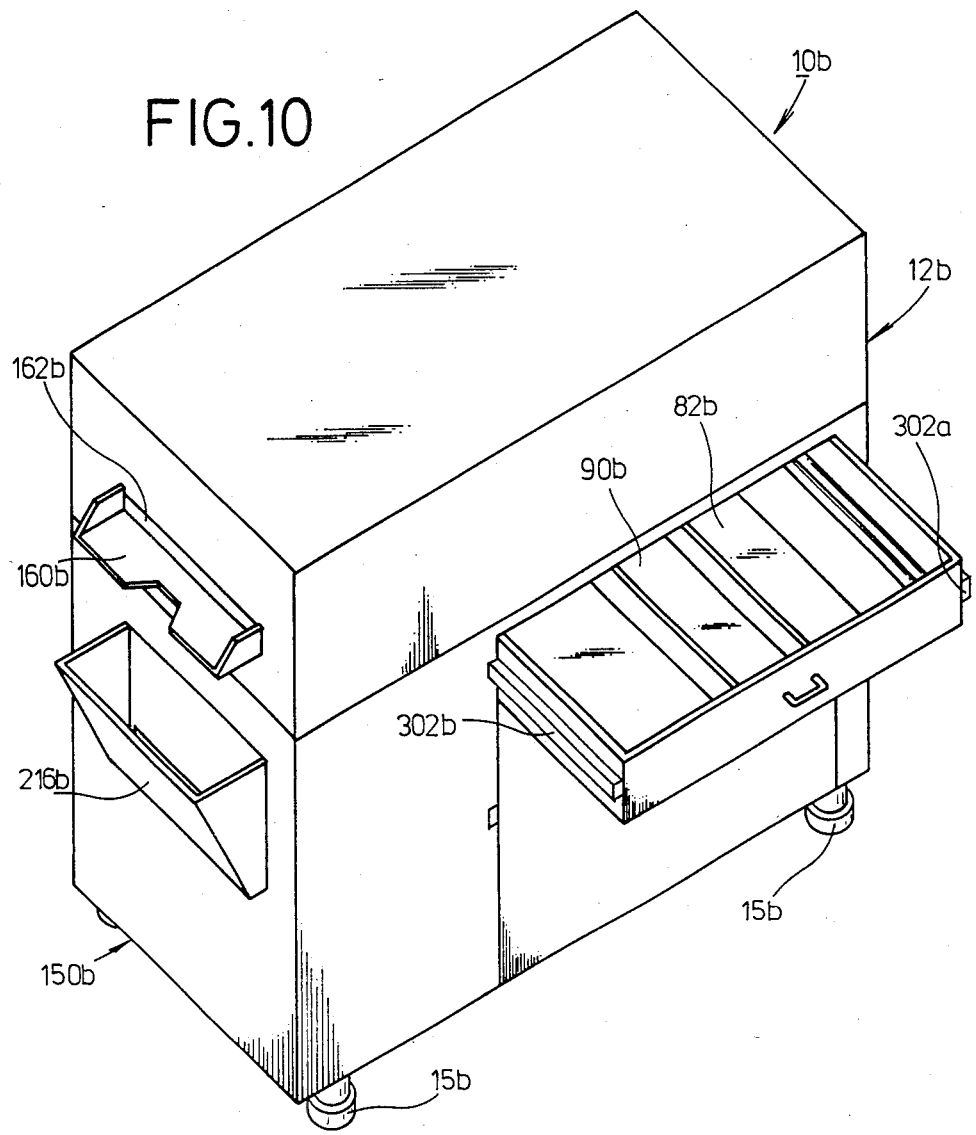
FIG. 10 is a perspective view of an image recording and developing apparatus according to a still further embodiment of the present invention.
Figure 11:
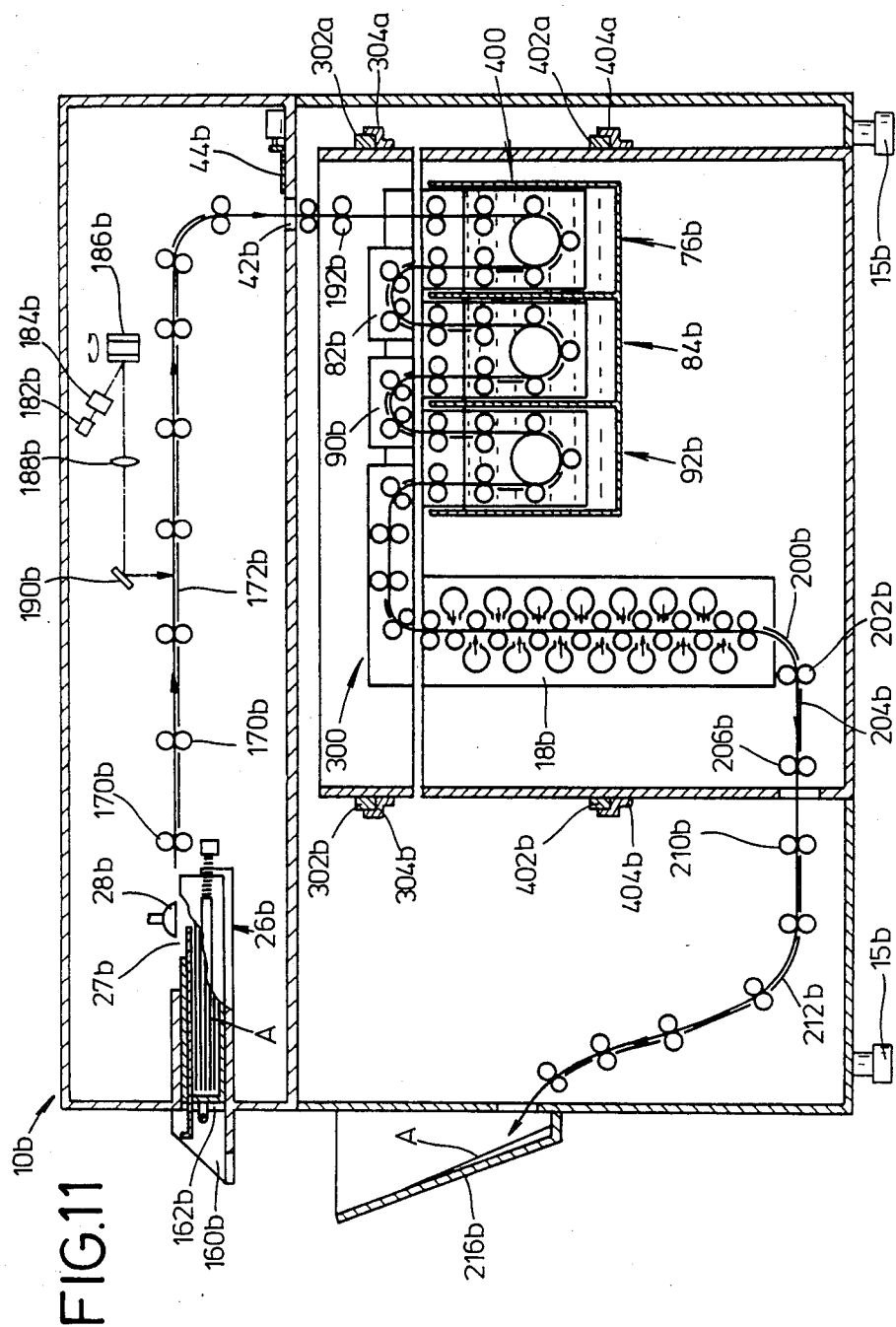
FIG. 11 is a vertical cross-sectional view of the image recording and developing apparatus shown in FIG. 10.

FIGS. 10 and 11 illustrate an image recording and developing apparatus according to a still further embodiment of the present invention. The embodiment of FIGS. 10 and 11 is somewhat similar to that shown in FIGS. 7 through 9, and those components which are identical to those shown in FIGS. 7 through 9 are denoted by identical reference numerals with a suffix b.

An automatic image developing unit 14b includes a film feeder 300 for feeding a film A into an image developing device 76b, an image fixing device 84b, a washing device 92b, and a film drier 18b through respective 180°-curved paths, and a processor 400 composed of the image developing device 76b, the image fixing device 84b, the washing device 92b, and the film drier 18b. The film feeder 300 has holders 302a, 302b held in sliding engagement with parallel horizontal rails 304a, 304b, respectively, in a storage casing 150b, and the film processor 400 has holders 402a, 402b held in sliding engagement with parallel horizontal rails 404a, 404b, respectively, in the storage casing 150b. Thus, the film feeder 300 and the film processor 400 can independently be pulled laterally out of the storage casing 150b. The conveyor systems in the film feeder 300 and the film processor 400 are positioned in alignment with each other when the film feeder 300 and the film processor 400 are fully housed in the storage casing 150b. Therefore, the film A can smoothly be conveyed through the film feeder 300 and the film processor 400. With this arrangement, the film feeder 300 which requires frequent servicing can easily be cleaned and serviced. Since the film feeder 300 can be pulled out of the storage casing 150b independently of the film processor 400 which contains various solutions, the film processor 400 is kept stable against vibration which would otherwise tend to cause the solutions to be mixed with each other. Because the film feeder 300 and the film processor 400 are completely separate from each other, the film processor 400 which is relatively heavy with various solution tanks is of a lower weight and can more easily be moved out of the storage casing 150b for replacement of the solutions and servicing of the film processor 400 than the integral structure of the film feeder and processor.

According to the embodiments shown in FIGS. 7 through 11, since the image recording unit is disposed above the storage casing in which the automatic image developing unit is laterally displaceably accommodated, the image recording and developing apparatus takes up a reduced floor space in a facility such as a hospital, allowing effective space utilization in such a facility. For maintenance and servicing of the automatic image developing unit, such as replacement of the solutions, only a space for accommodating the automatic image developing unit laterally displaced out of the storage casing needs to be provided on one side of the apparatus. The image recording unit may be relatively large in size since it is positioned above the storage casing. This allows a photographic photosensitive material to be processed flatwise for image recording in the image recording unit, which may therefore be of a simple and inexpensive mechanism. The inlet and outlet slots for such a photographic photosensitive material are disposed closely to each other, so that the photographic photosensitive material can easily be loaded into and unloaded from the apparatus by the operator. Because the photograhic photosensitive material is successively processed in the apparatus while it is being fed along through the apparatus, the time required for processing the photographic photosensitive material is relatively short.

Although certain preferred embodiments have been shown and described, it should be understood that many changes and modifications may be made therein without departing from the scope of the appended claims.

What is claimed is:

1. An image recording and developing apparatus, comprising:
    an image recording unit for scanning a photographic photosensitive material with a light beam modulated by image information, to record an image on the photographic photosensitive material;
    an automatic image developing unit coupled to said image recording unit for automatically developing the image recorded on photographic photosensitive material which has been fed from said image recording unit, said image recording unit and said automatic image developing unit being coupled to each other as a unitary assembly; and
    first vibroisolating means interposed between said image recording unit and said automatic image developing unit.

2. An image recording and developing apparatus according to claim 1, wherein said image recording unit and said automatic image developing unit jointly defined an outlet port therebetween for passage therethrough of the photographic photosensitive material from said image recording unit into said automatic image developing unit, further including a closure means for selectively closing said outlet port.

3. An image recording and developing apparatus according to claim 1, wherein said first vibroisolating means comprises an elastic gasket member.

4. An image recording and developing apparatus according to claim 2, wherein said closure means comprises a shutter and an actuator which is operatively coupled to said shutter and operable to move said shutter to open said outlet port only when said photographic photosensitive material is passed from said image recording unit through said outlet port into said automatic image developing unit.

5. An image recording and developing apparatus according to claim 1, further including second vibroisolating means by which at least said automatic image developing unit is to be placed on a floor.

6. An image recording and developing apparatus according to claim 5, wherein said second vibroisolating means comprises a plurality of legs each including an elastic member.

7. An image recording and developing apparatus according to claim 1, further including an inlet slot for loading the photographic photosensitive material into said image recording unit and an outlet slot for discharging the photographic photosensitive material out of said automatic image developing unit, said inlet and outlet slots being disposed closely to each other.

8. An image recording and developing apparatus according to claim 1, wherein said automatic image developing unit comprises a processor for processing the phtoographic photosensitive material and a drier for drying the photographic photosensitive material, said drier being disposed above said processor and having an outlet communicating with an outlet slot positioned in an upper portion of said image recording unit.

9. An image recording and developing apparatus according to claim 1, wherein said automatic image developing unit comprises a processor for processing the photographic photosensitive material and a drier for drying the photographic photosensitive material, said drier being movably mounted and disposed above said processor.

10. An image recording and developing apparatus according to claim 1, wherein said automatic image developing means includes a drier for drying the photographic photosensitive material, and further including means for supplying air heated by heat generated in at least one of said image recording unit and said automatic image developing unit to said drier, said heated air being ejected from said drier against the photographic photosensitive material.

11. An image recording and developing apparatus according to claim 1 further including a magazine containing the photographic photosensitive material and insertable into said image recording unit to load the photogaphic photosensitive material in the image recording unit, said image recording unit including an inlet slot for insertion of said magazine and guide rails disposed in said inlet slot for guiding the magazine from said inlet slot into said image recording unit.

12. An image recording and developing apparatus according to claim 1, further including a storage casing in which said automatic image devleoping unit is accommodated, said image developing unit being movably mounted within said storage casing so as to be movable laterally outwardly of said storage casing, said image recording unit being disposed upwardly of said storage casing.

13. An image recording an developing apparatus, comprising;
 an image recording unit for scanning a photographic photosensitive material with a light beam modulated by image information, to record an image on the photographic photosensitive material;
 an automatic image developing unit coupled to said image recording unit for automatically developing the image recorded on photographic photosensitive material which has been fed from said image recording unit, said image recording unit and said automatic image developing unit being coupled to each other as a unitary assembly; and
 an inlet slot for loading the photographic photosensitive material into said image recording unit and an outlet slot for discharging the photographic photosensitive material out of said automatic image developing unit, said inlet and outlet slots being disposed closely to each other.

14. An image recording and developing apparatus according to claim 13, including first vibroisolating means interposed between said image recording unit and said automatic image developing unit.

15. An image recording and developing apparatus according to claim 13, wherein said inlet and outlet slots are defined in said image recording unit.

16. An image recording and developing apparatus, comprising;
 an image recording unit for scanning a photograpohic photosensitive material with a light beam modulated by image information, to record an image on the photographic photosensitive material;
 an automatic image developing unit coupled to said image recording unit for automatically developing the image recorded on photographic photosensitive material which has been fed from said image recording unit, said image recording unit and said automatic image developing unit being coupled to each other as a unitary assembly; and
 wherein said automatic image developing unit comprises a processor for processing the photographic photosensitive material and a drier for drying the photographic photoensitive material, said drier being disposed above said processor and having an outlet communicating with an outlet slot positioned in an upper portion of said image recording unit.

17. An image recording and developing apparatus, comprising;
 an image recording unit for scanning a photographic photosensitive material with a light beam modulated by image information, to record an image on the photographic photosensitive material;
 an automatic image developing unit coupled to said image recoding unit for automatically developing the image recorded on photographic photosensitive material which has been fed from said image recording unit, said image recording unit and said automatic image developing unit being coupled to each other as a unitary assembly; and
 wherein said automatic image developing unit comprises a processor for processing the photographic photosensitive material and a drier for drying the photographic photosensitive material, said drier being movably mounted and disposed above said processor.

18. An image recording and developing apparatus according to claim 17, wherein said drier is swingably mounted on said processor, so that said drier can be pivoted to a position exposing said processor for servicing thereof.

19. An image recording and developing apparatus according to claim 17, further including drying air supply means for supplying drying air at a predetermined temperature to said drier, and a duct of a flexible material interconnecting said drier and said drying air supply means.

20. An image recording and developing apparatus, comprising;
 an image recording unit for scanning a photographic photosensitive material with a light beam modulated by image information, to record an image on the photographic photosensitive material;
 an automatic image developing unit coupled to said image recording unit for automatically develooping the image recorded on photographic photosensitive material which has been fed from said image recording unit, said image recording unit and said automatic image developing unit being coupled to each other as a unitary assembly; and wherein said automatic developing means includes a drier for drying the photographic photosensitive material, and means for supplying drying air to said drier and for causing said heated air to be ejected from said drier against said photographic photosensitive material, comprising means for drawing air heated by heat generated in at least one of said image recording unit and said automatic image developing unit.

21. An image recording and developing apparatus according to claim 20, further including a control unit for controlling the operation of said image recording unit, and wherein said drawing means comprises a duct having an air fan and interconnecting said control unit and said drier, whereby hot air in said control unit can be supplied by said air fan through said duct into said drier.

22. An image recording and developing apparatus according to claim 20, further including a control unit for controlling the operation of said automatic image developing unit, and wherein said drawing means comprises a duct having an air fan and interconnecting said control unit and said drier, whereby hot air in said control unit can be supplied by said air fan through said duct into said drier.

23. An image recording and developing apparatus according to claim 21, further including an air temperature control mechanism connected to said duct and having a temperature sensor for detecting the temperature of air from said duct, and a heater energizable by said temperature sensor for heating the air drawn from said control unit through said duct, said heated air being supplied to said drier.

24. An image recording and developing apparatus according to claim 22, further including an air temperature control mechanism connected to said duct and having a temperature sensor for detecting the temperature of air from said duct, and a heater energizable by said temperature sensor for heating the air drawn from said control unit through said duct, said heated air being supplied to said drier.

25. An image recording and developing apparatus, comprising;
an image recording unit for scanning a photographic photosensitive material with a light beam modulated by image information, to record an image on the photographic photosensitive material;
an automatic image developing unit coupled to said image recording unit for automatically developing the image recorded on photographic photosensitive material which has been fed from said image recording unit, said image recording unit and said automatic image developing unit being coupled to each other as a unitary assembly; and further including a storage casing in which said automatic image developing unit is accommodated, said image developing unit being movably mounted within said storage casing so as to be movable laterally outwardly of said storage casing, said image recording unit being disposed upwardly of said storage casing.

26. An image recording and developing apparatus according to claim 25, wherein said automatic image developing unit comprises a processor having processing tanks for respectively developing, fixing, and washing the photographic photosensitive material fed from said image recoding unit, and a feeder for feeding the photographic photosensitive material into said processing tanks, said feeder being separable from said processor and movable out of said storage casing.

27. An image recording and developing apparatus according to claim 26, wherein said processor including said processing tanks is movable laterally out of said storage casing in one direction independently of said feeder.

28. An image recording and developing apparatus according to claim 26, wherein said feeder and said processor include conveyor systems, respectively, for transferring the photographic photosensitive material, said conveyor systems being positionable in alignment with each other when said feeder and said processor are accommodated in said storage casing.

29. An image recording and developing apparatus, comprising;
an image recording unit for scanning a photographic photosensitive material with a light beam modulated by image information, to record an image on the photographic photosensitive material;
an automatic image developing unit coupled to said image recording unit for automatically developing the image recorded on photographic photosensitive material which has been fed from said image recording unit, said image recording unit and said automatic image developing unit being coupled to each other as a unitary assembly; and
further including a magazine containing said photographic photosensitive material, said magazine being insertable into said image recording unit to load the photographic photosensitive material in the image recording unit, said image recording unit including an inlet slot for insertion of said magazine and guide rails disposed in said inlet slot for guiding said magazine from said inlet slot into said image recording unit.

30. An image reoording and developing apparatus according to claim 29, wherein said magazine includes an access opening for removal of the photographic photosensitive material from the magazine, and a shutter for normally closing and selectively opening said access opening.

* * * * *